No. 859,099. PATENTED JULY 2, 1907.
W. NICE, Jr.
PRESSED STEEL WHEEL.
APPLICATION FILED JUNE 15, 1906.

WITNESSES:—
Louis H Buck
R R Mitchell

INVENTOR
Wm. Nice, Jr.
BY
Charles N. Butler
ATTORNEY.

UNITED STATES PATENT OFFICE.

WILLIAM NICE, JR., OF OGONTZ, PENNSYLVANIA.

PRESSED-STEEL WHEEL.

No. 859,099.

Specification of Letters Patent.

Patented July 2, 1907.

Application filed June 15, 1906. Serial No. 321,849.

*To all whom it may concern:*

Be it known that I, WILLIAM NICE, Jr., a citizen of the United States, and a resident of Ogontz, in the county of Montgomery and State of Pennsylvania, have invented certain Improvements in Pressed-Steel Wheels, of which the following is a specification.

This invention is a pressed steel wheel comprising two pieces each of which has formed integrally a web which enters into the body; a flange which enters into the peripheral bearing, and a flange which enters into the hub, the webs bearing against each other or against a stiffening piece disposed between them.

Figure 1:
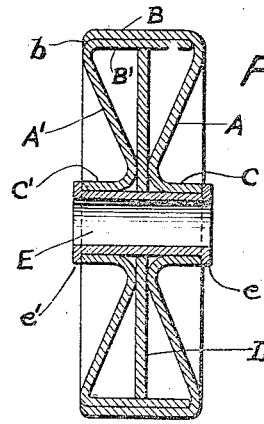
Figure 2:
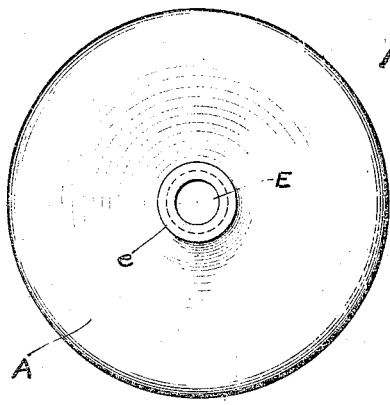
Figure 3:
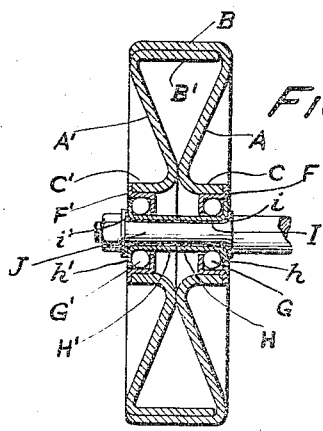
Figure 4:
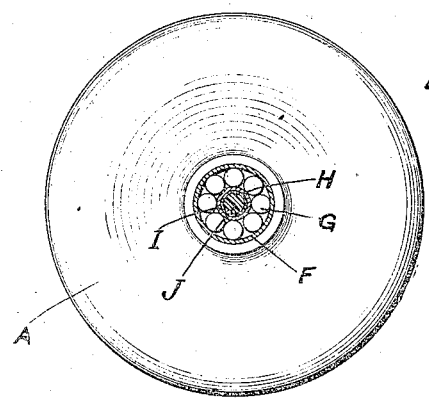
Figure 5:
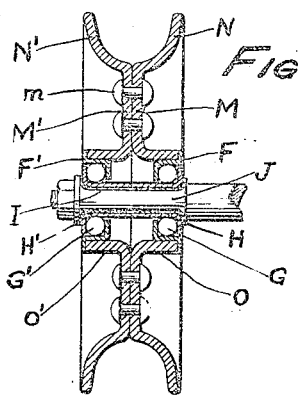

In the drawings, Figure 1 represents a sectional view and Fig. 2 represents a side elevation of a form of the invention; Fig. 3 represents a sectional view and Fig. 4 represents a side elevation in partial section of a second form of the invention with ball bearings applied thereto; Fig. 5 represents a sectional view and Fig. 6 represents a side elevation in partial section of a third form of the invention.

As shown in Figs. 1 and 2 of the drawings, the wheel comprises two members, each essentially Z-shaped in cross section, having the body members A, A'; the peripheral flanges B, B', telescoping to form the tread or bearing, and held together by the bead $b$ turned down from the flange B to engage the part B'; and the oppositely disposed flanges C, C', which enter into the hub. A brace D in the form of a disk is placed between these two parts and acts as a stiffening piece for supporting the several members. A sleeve E, telescoping within the hub flanges C, C', and passing through the brace D, is provided with the flanges $e$, $e'$, which respectively engage the corresponding parts C, C'.

As shown in Figs. 3 and 4, the body members A, A', having the telescoping peripheral flanges B, B' and the oppositely disposed hub flanges C, C', are in direct bearing contact. In place of the plain sleeve or bushing E there are substituted ball bearings comprising the rings F, F', of Z-shaped cross-section, disposed within and engaging the hub flanges C, C'; the tubular rings H, H', having the flanges $h$, $h'$, thereon forming a sectional bushing; the balls G, G' disposed between the rings F and H, F' and H'; and the soft metal jacket or bushing I having the end flanges $i$, $i'$, for holding the tubular bearings H, H' in place. Within this ball bearing there is secured the spindle J.

Figure 6:
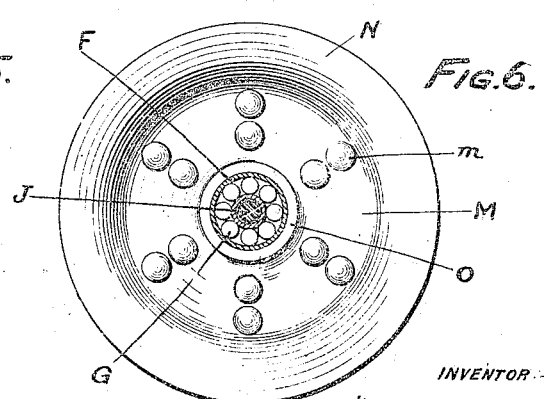

As shown in Figs. 5 and 6, the construction is modified to provide a pulley having the body members M, M', secured together by the rivets $m$; the peripheral flanges N, N', forming a concave bearing for a rope or the like; and the hub flanges O, O', which receive the ball bearings shown in Figs. 3 and 4 and comprising the rings of Z-shaped section F, F', the tubular rings H, H', the balls G, G', and the soft metal jacket I within which is disposed the spindle J.

The wheel, in its main features, can be constructed very economically by pressing steel to shape, the structure is such that the parts can be assembled very readily and the parts are so braced as to provide ample strength.

It will be understood that the ball bearing construction shown in Figs. 3 and 4 can be substituted for the plain bushing shown in Figs. 1 and 2.

Having described my invention I claim:—

1. A wheel comprising members of substantially Z-shaped cross section each having a web, a peripheral flange and an outwardly disposed hub flange, the peripheral flanges telescoping with each other and forming a tread for the wheel.

2. A wheel comprising two pressed steel members of substantially Z-shaped cross section, each of said members having a web, a peripheral flange, and a hub flange, said peripheral flanges telescoping and being held together by a bead formed on one and engaging the place of juncture of the other with its web.

3. A pressed steel wheel having webs entering into the body and outwardly turned flanges entering into the hub, substantially Z-shaped rings engaging said hub flanges, balls engaging said rings, tubular rings having flanges thereon for holding said balls in engagement with said first named rings, and a bushing having flanges for holding said tubular rings.

In testimony whereof I have hereunto set my name this 12th day of June, 1906, in the presence of the subscribing witnesses.

WM. NICE, JR.

Witnesses:
JOS. G. DENNY, Jr.,
ROBERT JAMES EARLEY.